United States Patent [19]
Petrich

[11] Patent Number: 5,881,574
[45] Date of Patent: Mar. 16, 1999

[54] APPARATUS AND METHOD FOR CONTACTING A GASEOUS PHASE WITH A LIQUID PHASE

[75] Inventor: Elso Petrich, Mendoza, Argentina

[73] Assignee: Silvestrini y Barbier Sociedad de Hecho, Mendoza, Argentina

[21] Appl. No.: 15,008

[22] Filed: Jan. 28, 1998

[51] Int. Cl.[6] .................................................. F25J 1/00
[52] U.S. Cl. ............................... 62/616; 62/121; 62/902; 261/79.2
[58] Field of Search ............................ 62/616, 121, 902; 261/79.2

[56] References Cited

U.S. PATENT DOCUMENTS

| | | | |
|---|---|---|---|
| 793,110 | 6/1905 | Uehling . | |
| 891,474 | 6/1908 | Gressly . | |
| 1,493,871 | 5/1924 | Stancliff | 62/902 |
| 2,687,780 | 8/1954 | Culhane | 183/22 |
| 3,669,425 | 6/1972 | Copeland | 261/79 |
| 3,722,185 | 3/1973 | Miczek | 55/238 |
| 3,785,125 | 1/1974 | DeSeversky | 55/119 |
| 3,789,582 | 2/1974 | Graybill | 55/92 |
| 3,969,093 | 7/1976 | Murray, Jr. | 55/229 |
| 4,514,194 | 4/1985 | Jarvenpaa | 55/91 |
| 5,207,068 | 5/1993 | Bridden | 62/121 |
| 5,405,497 | 4/1995 | Torregrossa | 162/38 |

*Primary Examiner*—Ronald C. Capossela
*Attorney, Agent, or Firm*—Carlton, Fields et al.

[57] ABSTRACT

A liquid phase is placed into contact with a steam or gaseous phase to cause a reaction, heat and/or matter transfer, where the contact of the phases occurs within at least one annular chamber formed of two or more concentric and substantially coaxial elongated cylindrical members. The gaseous phase and the liquid phase typically enter the chamber at opposite ends cylindrically rotating in the same direction and in countercurrent, with the gaseous phase and at least a substantial portion of the product formed by the contact between the phases exiting the at one end of the apparatus and the residual liquid phase exiting at the other end.

28 Claims, 8 Drawing Sheets

APPARATUS AND METHOD FOR CONTACTING A GASEOUS PHASE WITH A LIQUID PHASE

BACKGROUND OF THE INVENTION

1. Field of the Invention

The present invention relates generally to a method and apparatus for placing a liquid phase in contact with a vapor or gaseous phase, and more particularly, for placing the liquid phase in contact with the vapor or gaseous phase within an elongated annular chamber, such as to cause a reaction, heat and/or matter transfer and the later separation of the phases.

2. Description of the Prior Art

There are numerous processes in which it is desirable to place a liquid phase in contact with steam or a gaseous phase. One well know example is distillation where a gaseous phase or steam is bubbled within a liquid phase. Typically, the bubbling occurs in columns divided by a plurality of bubbling plates, with toothed parts placed on the plates or holes formed through the plates to provide for appropriate introduction of the gas into the liquid, such that steam or other rising gases bubble through falling liquid phases. However, such conventional devices have several disadvantages. In particular, the calculation of column diameter for a given working capacity depends largely upon the speed of the steam going through the column, which results in inflexible design restrictions. In addition, because the increase of steam speed will cause unacceptable alterations, such as foaming, in the operation of the apparatus, the only practical way of increasing capacity of the device is to increase the column area. The spacing between the plates is also largely dependent upon the materials used in the process. Consequently, the height of such a conventional apparatus, which is usually formed of numerous plates, is significantly influenced by the materials used in the process. Furthermore, the substantial volume of liquid and gaseous phases used in such processes usually requires substantial start-up and stop times associated with such processes.

Another well known system is the packing column in which the phase contact is achieved by the phases moving in countercurrent through complicated paths, which are determined by the existence of numerous inaccessible portions that occupy the volume of the column. Various arrangements of the packing column models have been developed that offer the greatest possible area for phase contact. The primary advantage of this approach over the bubbling column is its simpler construction and the substantial inaccessibility of the parts. However, the constant operation of the packing column apparatus is more difficult to maintain and adjust in order to avoid the "flooding problem" within the device. Specifically, there is a delicate equilibrium associated with the packing column that is easily broken upon the unwanted accumulation of liquid. This generally results in more burdensome and complex start-up and stop operations for such an apparatus than those for the bubbling column. In addition, the design of large capacity packing column units is complicated.

In other situations a liquid phase may be sprayed through a gaseous phase, which process may be repeated in successive chambers. Such approaches, however, have been found to be disadvantageous due to the large volume and substantial power requirements.

Still another relatively common approach for contacting a gas with a liquid is to introduce the liquid phase and the gaseous phase in countercurrent within a hollow cylindrical or conical member. Typically the liquid phase rotates downwardly along the sidewall of the member, with the gaseous phase rotating upwardly. In general, there are substantial difficulties associated with increasing the capacity of such systems.

SUMMARY OF THE INVENTION

It is an object of the present invention to provide a method and apparatus in which a liquid phase is placed into contact with a gaseous phase to form a desired product. It is another object of the present invention to provide a method and apparatus having relatively short start-up and stop operations. It is still another object of the present invention to provide an apparatus having a relatively large contact area with respect to the total volume of such apparatus. Yet another object of the present invention is to provide an annular contact chamber in which the liquid phase and gaseous phase are maintained within close proximity to each other to facilitate phase contact. Another object of the present invention is to provide an apparatus having a relatively low manufacturing cost having a capacity that may be conveniently expanded.

In order to achieve these and other objects that will become apparent to those skilled in the art, the apparatus of the present invention is directed to a gas and liquid contact apparatus comprising a plurality of concentric and substantially coaxial elongated cylindrical members, each of these plurality of cylindrical members having a diameter, a first end, a second end, a cylindrical sidewall portion extending between the first and second ends, an inner cylindrical surface and an outer cylindrical surface, with adjacent pairs of cylindrical members being spaced respective predetermined distances apart to define an elongated annular chamber between each adjacent pair of cylindrical members, the diameter of each cylindrical member generally increasing in size from an inner cylindrical member to an outer cylindrical member. The apparatus also includes a liquid outlet port disposed in the outer cylindrical member adjacent to the second end thereof, a liquid inlet disposed in the side wall portion of at least one cylindrical member proximal to the first end of such cylindrical member for providing a first liquid phase that rotates cylindrically in a predetermined direction along that cylindrical member inner surface to define a rotating film of the liquid phase, the rotating film helically traversing the length of the cylindrical member from its liquid inlet to the liquid outlet port. The apparatus also includes a gas inlet positioned proximal to the second end of the outer cylindrical member for introducing a rotating gaseous phase, such that the gaseous phase traverses helically from the gas inlet into the annular chamber of the rotating film to a position adjacent the first end of the cylindrical member, with the gaseous phase rotating in the same angular direction as and in axial countercurrent to the rotating film and engaging at least a substantial portion of the rotating film to form a product, and the apparatus including a gas outlet disposed in such cylindrical member adjacent to the end of the one cylindrical member for exhausting at least a portion of the gaseous phase and at least a substantial portion of the product.

The method of the present invention operates in a structure, such as that just described, and comprises the steps of introducing a liquid phase tangentially onto the inner surface of at least one cylindrical member within at least one annular chamber, such that at least a substantial portion of the liquid phase forms the cylindrically rotating film along the inner surface of such cylindrical member. The rotating film traverses along the surface of the cylindrical member from the liquid inlet a substantial portion of the length of the cylindrical member to a position adjacent to the outer cylindrical member second end. The method also includes introducing a gaseous phase tangentially to the inner surface of a short cylindrical member, such that a substantial portion of the gaseous phase helically flows from the short cylindrical member into the one chamber and to a position substantially adjacent to the first end of the one cylindrical member, with the gaseous phase rotating in the same angular direction and in axial countercurrent to the rotating film and engaging at least a substantial portion of the rotating film to form a product, exhausting at least a substantial portion of the gaseous phase and at least a substantial portion of the product through an upper outlet positioned intermediate the liquid inlet and the first end of the one cylindrical member, and exhausting a substantial portion of the liquid phase through the lower liquid outlet.

BRIEF DESCRIPTION OF THE DRAWINGS

Preferred embodiments of the present invention are illustrated in the drawings in which.

DESCRIPTION OF A PREFERRED EMBODIMENT

Preferred embodiments of an apparatus for placing a liquid phase in contact with a gaseous phase are illustrated in FIGS. 1–15. In general, the apparatus of the present invention is formed of a plurality of concentric and substantially coaxial cylindrical members, with each adjacent pair of such members forming an elongated chamber for contacting a cylindrically rotating liquid phase with a rotating gaseous phase that may be introduced into such chamber.

Figure 1:
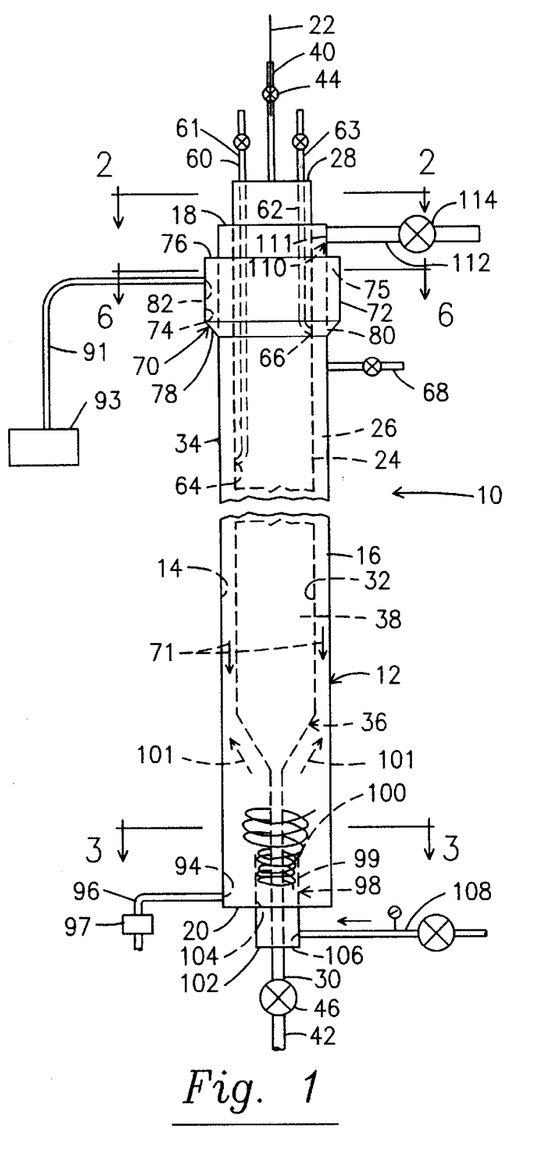
FIG. 1 is a side elevation of a preferred embodiment of the apparatus in accordance with the present invention.
Figure 2:
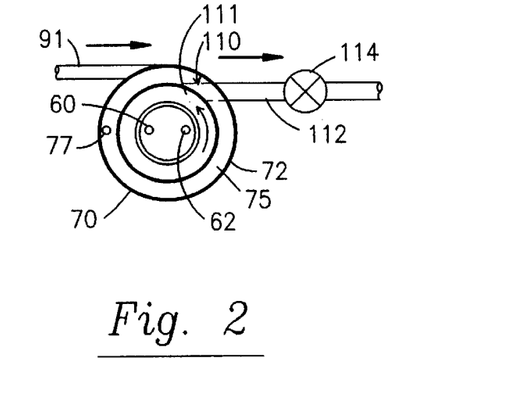
FIG. 2 is a sectional view of the apparatus of FIG. 1 taken along lines 2—2.
Figure 3:
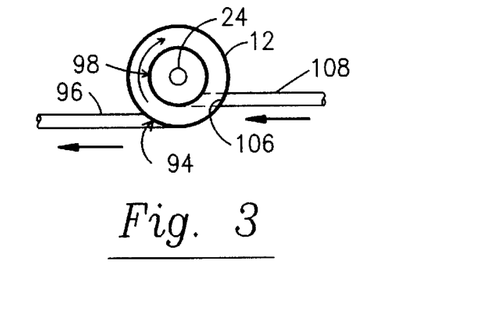
FIG. 3 is a sectional view of the apparatus of FIG. 1 taken along lines 3—3.

Referring to the preferred embodiment of FIGS. 1–3, the apparatus 10 includes an outer, or first, elongated cylindrical member 12 having a predetermined diameter, an inner cylindrical surface 14, and an outer cylindrical surface 16. Outer cylindrical member 12 also has a first end 18, a second end 20 spaced a predetermined distance apart from first end 18, and a longitudinal axis 22 extending through its first and second ends 18 and 20. An inner, or second, elongated cylindrical member 24, which has a diameter smaller than the outer cylindrical member diameter, is positioned generally concentrically within and coaxial with the first cylindrical member 12 to define a first annular chamber 26 between the inner and outer cylindrical members 24 and 12, respectively. Inner cylindrical member 24 has a first end 28 spaced a predetermined distance from its second end 30, with first and second ends 28 and 30 being spaced apart a distance that may be generally equal to, although typically greater than, the distance between the outer cylindrical member first and second ends 18 and 20, respectively. As shown in FIG. 1, uppermost portions of the inner cylindrical member 24 extend beyond the uppermost portions of outer cylindrical member 12. Similar to the outer cylindrical member 12, the inner cylindrical member 24 also includes an inner cylindrical surface 32 and an outer cylindrical surface 34, with at least a portion of the outer surface 34 being substantially parallel to and spaced a predetermined distance apart from the first cylindrical member inner surface 14, which spaced apart cylindrical portions define annular chamber 26.

Figures 9, 10, 11:
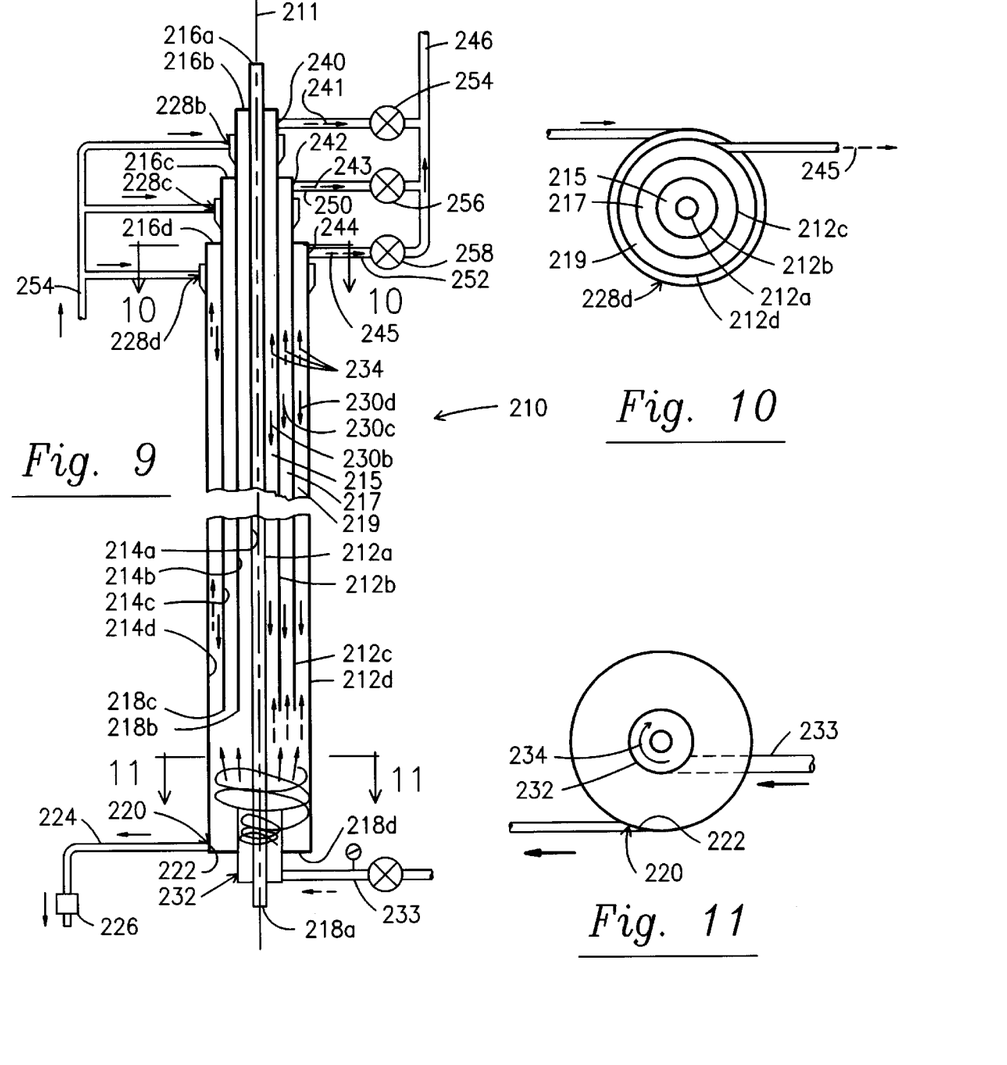
FIG. 9 is an alternative embodiment of the apparatus of FIG. 1 in accordance with the present invention.
FIG. 10 is a sectional view of the apparatus of FIG. 9 taken along lines 10—10.
FIG. 11 is a sectional view of the apparatus of FIG. 9 taken along lines 11—11.
Figure 12:
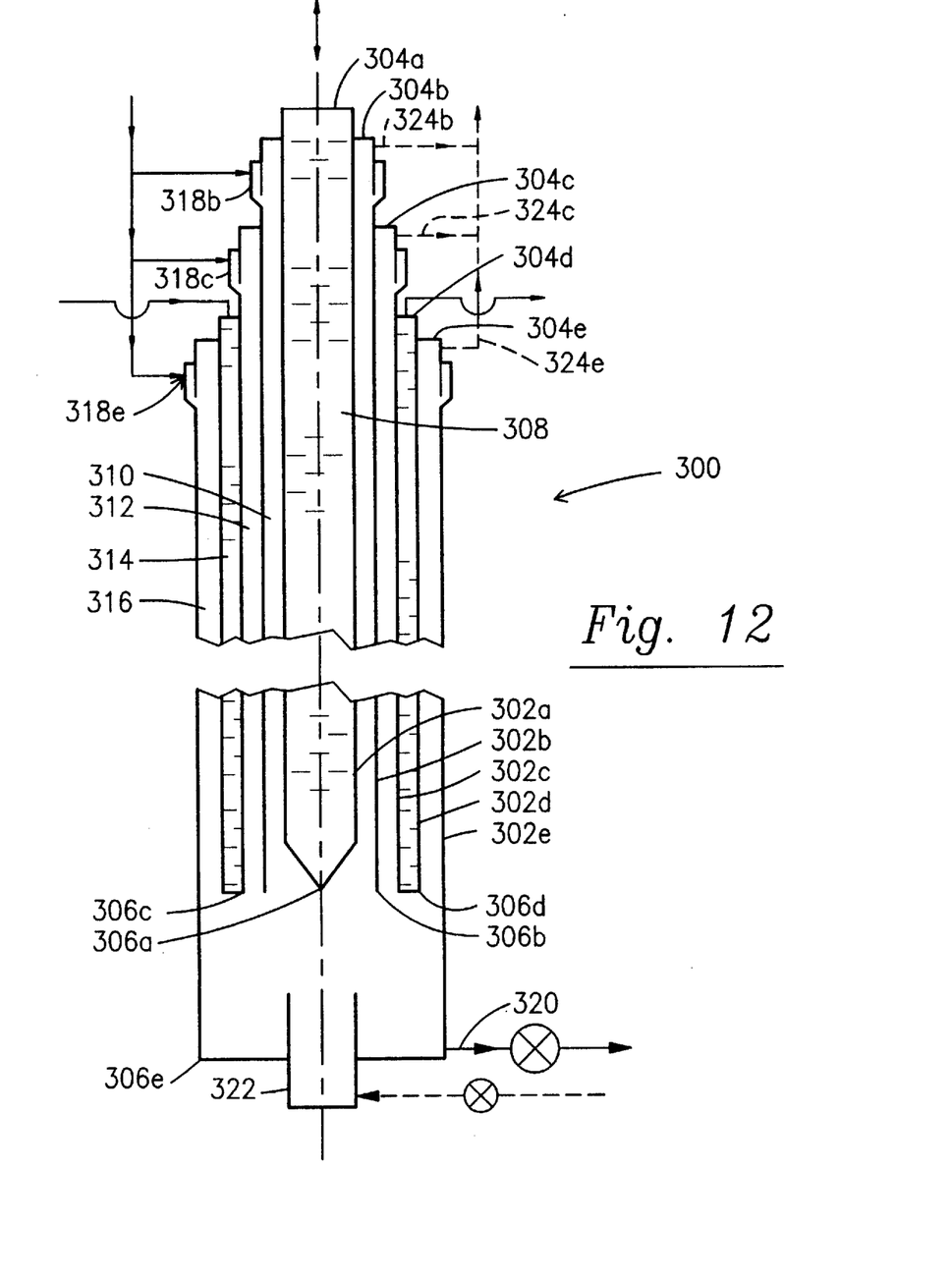
FIG. 12 is a schematic representation of an alternative embodiment of the apparatus of the FIG. 1, illustrating a plurality of chambers.
Figure 14:
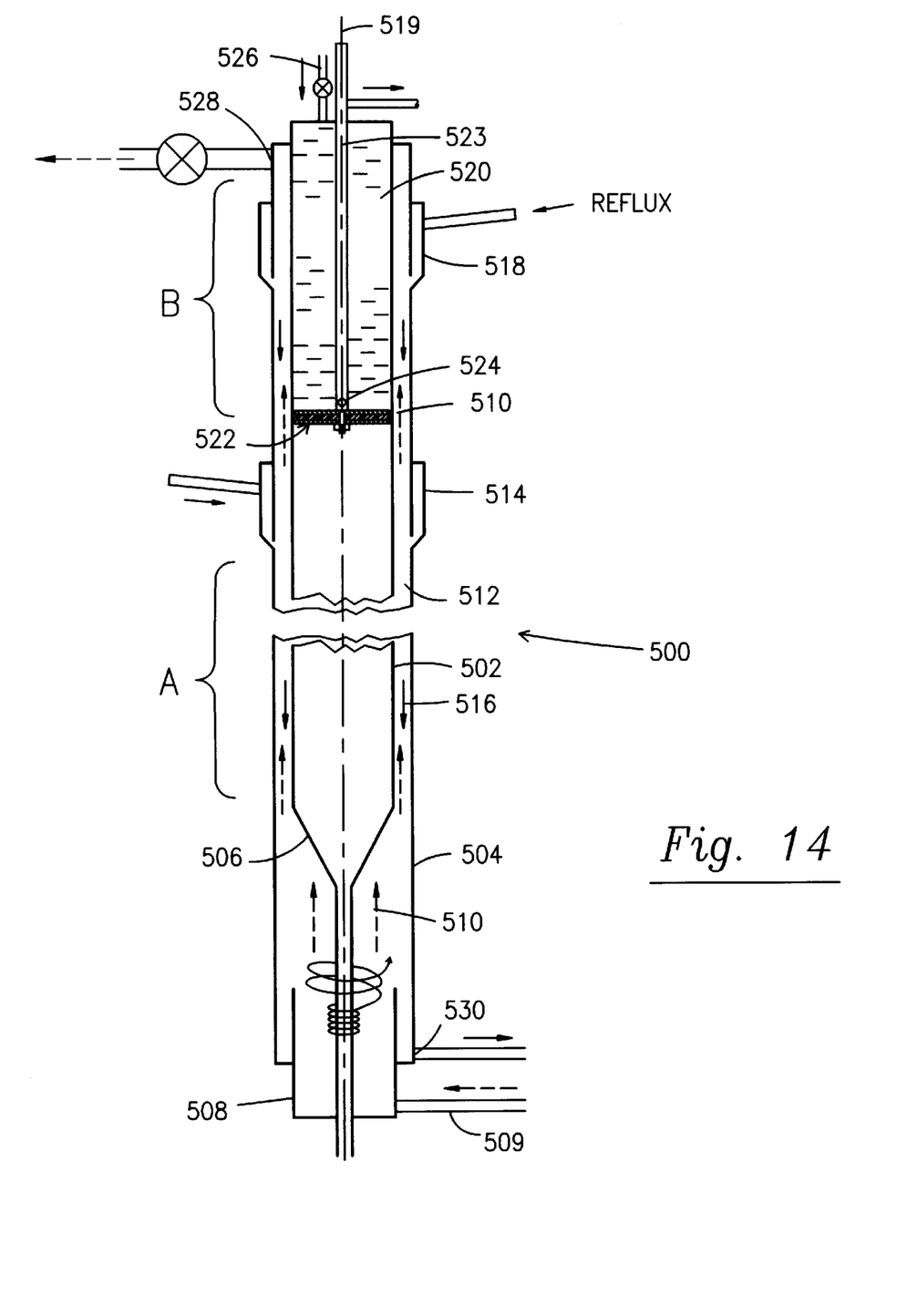
FIG. 14 is an alternative embodiment of the apparatus of FIG. 1, illustrating more than one process within a common chamber in accordance with the present invention.

As shown in FIGS. 1, 10 and 14, the inner cylindrical member 24 may include a generally frusto-conical portion 36 positioned intermediate the second member first and second ends 28 and 30, although preferably within outer cylindrical member 12 positioned proximal to second end 30. The frusto-conical portion 36 tapers from a first predetermined diameter, which suitably extends from the first end 28 to the frusto-conical portion 36, to a smaller second predetermined diameter at a position proximal to second cylindrical member second end 30, which second predetermined diameter of inner cylindrical member 24 is preferably maintained from the frusto-conical portion 36 to the second cylindrical member second end 30. In the preferred embodiment of FIG. 1, frusto-conical portion 36 guides the rotating gaseous phase into annular chamber 26. It will be apparent to those skilled in the art that, instead of extending beyond outer cylindrical member second end 20, inner cylindrical member 24 may terminate in a conical portion positioned above the gas inlet, such as is shown in FIG. 12, with no conduit extending from Frusto-conical portion 36 through outer cylindrical member second end 20.

One advantageous aspect of the apparatus of the present invention is that the fluids having a predetermined temperature may be introduced within certain elongated chambers to facilitate certain processes, reactions and the exchange of materials between the gaseous phase and the liquid phase. For example, as shown in FIG. 1, cooling or heating fluids may be introduced into a central chamber 38, defined by the interior volume of inner cylindrical member 24, by means of conduits 40 an 42 attached at opposed ends of the inner cylindrical member 24. The introduction and withdrawal of fluids may conveniently be controlled by appropriate regulator valves 44 and 46.

Figures 4, 5:
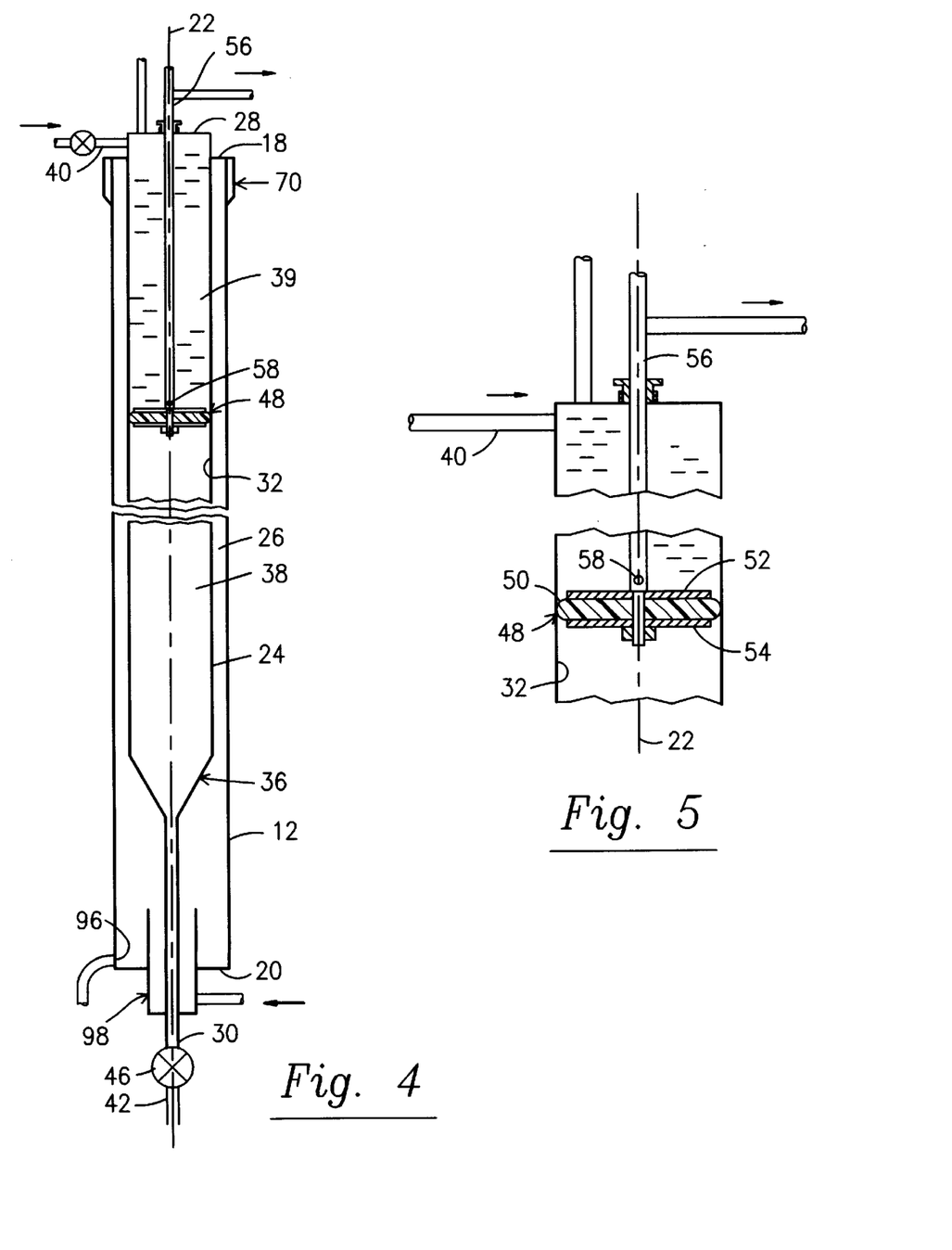
FIG. 4 is an alternative preferred embodiment of the apparatus of FIG. 1 in accordance with the present invention.
FIG. 5 is a detailed partial view of the central chamber of the apparatus of FIG. 4.

FIGS. 4 and 5 illustrate the apparatus of FIG. 1 with the addition of a preferred mechanism for dividing the volume of central chamber 38 into a section having a selectable volume 39, in which fluids having a predetermined temperature may circulate. More particularly, the apparatus 10 includes a partition, generally indicated as 48, selectively movable axially within the central chamber 38 to form the desired predetermined volume 39 for the circulating fluids. Partition 48 may be used, for example, to divide central chamber 38 into two sections for enabling a single apparatus 10 to conduct more than one process, such as in stages. Preferably, partition 48 is formed of a generally flat elastic disc 50, suitable formed of an elastomer or other elastic materials, interposed between two rigid plates 52 and 54, suitably metal discs, that sandwich and position elastic disc 50 such that its periphery engages the inner cylindrical surface 32 of inner member 24 to form a substantially liquid-tight seal therewith. As shown in the more detailed view of FIG. 5, axial movement of partition 48 within central chamber 38 may be accomplished, for example, by connecting partition 48 to a selectively moveable rigid member, such as a conduit 56, which may be urged axially to a desired predetermined position within central chamber 38. Conduit 56 preferably includes an opening 58 at its lower end proximal to partition 48, through which opening 58 desired fluids may be introduced into, or be withdrawn from, predetermined volume 39. An additional conduit 40 disposed in inner cylindrical member 24 adjacent to its first end 28 also may be used for introducing or extracting the circulating fluids.

Referring to FIGS. 1 and 2, one or more additional conduits 60 and 62 may extend within the central chamber 38, with the second end 64 and 66 of each respective conduit 60 and 62 disposed in the sidewall portion of inner cylindrical member 24 at a predetermined axial position for providing a passage into chamber 26. Conduits 60 and 62 may be used for introducing reagent materials or for extracting a portion of a liquid phase and/or a gaseous phase, as, for example, in a rectification process. The first ends 61 and 63 of conduits 60 and 62, respectively, are positioned outside the central chamber 38 and coupled to appropriate regulation mechanisms for controlling the input or withdrawal of materials. Similarly, conduit 68, which is disposed in the sidewall portion of cylindrical member 12 at a predetermined axial position, may be used for introducing or extracting various materials into or from chamber 26. Obviously, conduits 60, 62 and 68 may have numerous beneficial uses, including, but not limited to, taking samples during the process, introducing other substances for improving or activating a desired process, and extracting a gas and/or liquid phase having a greater concentration of substances, such as impurities, that may be undesirable in the final products obtained. In general, the position of second ends 64 and 66 and of conduit 68 will depend largely upon the particular process for which the particular apparatus 10 is to be used and the intended purpose of the respective conduits.

Apparatus 10 also includes a liquid inlet, generally indicated as 70, disposed in the outer cylindrical member 12 proximal to its first end 18 for providing a preselected liquid phase along the first cylindrical member inner surface 14. The liquid phase rotates in a predetermined direction to define a rotating film, indicated by solid arrows 71, such that a substantial portion of the rotating film 71 traverses the interior length of the cylindrical member 12 from the liquid inlet 70 to a position adjacent the cylindrical member second end 20. While materials introduced by liquid inlet 70, and the inlets of other preferred embodiments, are termed a liquid phase, it will be understood that such liquid phase may comprise a mixture of liquids, vapors, particles, compositions and/or substances.

Figures 6, 8:
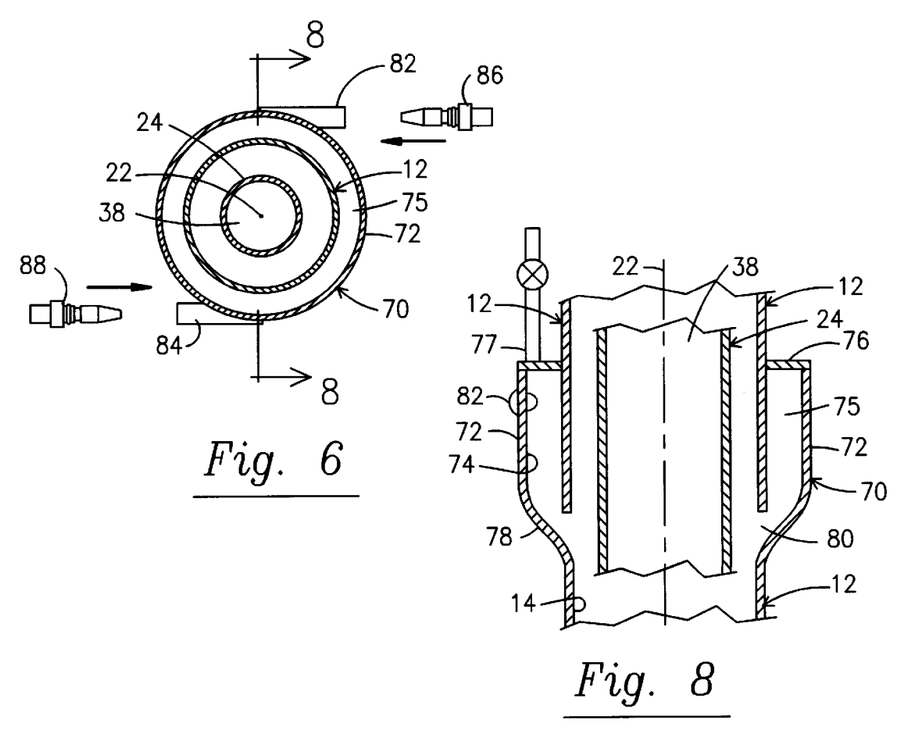
FIG. 6 is a partially exploded sectional view taken along lines 6—6 of FIG. 1, illustrating a preferred embodiment of a liquid inlet in accordance with the present invention.
FIG. 8 is a sectional view of the apparatus of FIG. 6 taken along lines 8—8.
Figure 7:
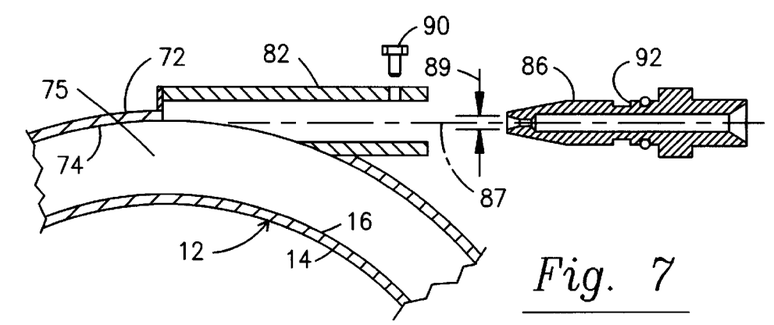
FIG. 7 is a fragmentary view of the apparatus of FIG. 6 at an enlarged scale, further illustrating a preferred liquid inlet in accordance with the present invention.

FIGS. 6–8 illustrate a particularly preferred embodiment of the liquid inlet 70 of apparatus 10, by which a liquid phase may be introduced onto the inner cylindrical surface 14 of outer cylindrical member 12 without violent dispersive contact with the gaseous phase within chamber 26. This preferred construction of liquid inlet 70 also substantially reduces unwanted dragging that is typically associated with a high speed gas or vapor contacting a liquid, where the gas tends to drag foams, small liquid drops or small particles present in the liquid.

The preferred embodiment of FIGS. 6 and 8 illustrate liquid inlet 70 formed of a relatively short cylindrical member 72, having an axial length of about 1.5 times its diameter, positioned concentrically around and coaxial with a portion of cylindrical member 12, preferably proximal to the cylindrical member first end 18. Liquid inlet cylindrical member 72 defines an annular chamber 75 between cylindrical members 12 and 72. Cylindrical member 72 has a generally cylindrical inner surface 74, a closed first end 76 and a second end 78 attached to the outer cylindrical member 12 at the lower portion of annular opening 80 formed in outer cylindrical member 12 proximal to, and spaced a predetermined distance from cylindrical member first end 18. Annular opening 80 has a predetermined axial height, which may be about 10 mm in the sidewall portion of outer cylindrical member 12, to permit the passage of liquids from chamber 75 into chamber 26. The liquid inlet cylindrical member 72 should have a diameter that is slightly greater than the diameter of the cylindrical member 12 to which it is attached and supplies the liquid phase.

The desired liquid phase is provided within chamber. 75, such that it forms a thin, cylindrically rotating film that may flow smoothly from the liquid inlet cylindrical member inner surface 74 onto the inner cylindrical surface 14 of outer member 12. Preferably, the lower portion of cylindrical member 72 is curved, which may be generally S-shaped, in order to provide a smooth transition between the cylindrical inner surface 74 and inner cylindrical surface 14 of cylindrical member 12.

As shown in FIG. 6, at least one liquid inlet port 82, although suitably two or more substantially equidistantly spaced ports 82 and 84 are disposed in the liquid inlet cylindrical member 72 proximal first end 76 for injecting the liquid phase substantially tangentially and in a predetermined common direction along the inner cylindrical surface 74 to form the rotating film. The liquid phase preferably is injected at a preselected pressure through a nozzle 86, or a pair of nozzles 86 and 88, that is releasably secured to liquid inlet ports 82, such as by a threaded fastener 90 that engages nozzle 86 within a recessed portion thereof 92. While the nozzles 86 and 88 are illustrated spaced from ports 82 and 84 for clarity of explanation, in use the nozzles are inserted into parts 82 and 84 and retained by suitable means, such as fastener 90 in FIG. 7. Each nozzle 86 has a predetermined exit diameter 89 and a nozzle axis 87 that is aligned substantially tangentially to cylindrical inner surface 74 of liquid inlet cylinder 72, shown in FIG. 7. In addition, nozzles 86 and 88 are easily interchangeable with other nozzles, which may have different exit diameters or spray characteristics, so that the liquid inlets can be modified to supply different materials and at different rates. Accordingly, a single apparatus may conveniently be adapted for numerous different processes.

Referring between FIG. 1 and FIGS. 6–8, each nozzle 86 and 88 is attached to an appropriate conduit 91 that is coupled to an appropriate source of the desired liquid phase, which source of pressurized liquid defines a liquid injection assembly that provides the liquid phase at a predetermined flow rate for a predetermined time. With the longitudinal axis 22 positioned vertically, each nozzle 86 and 88 preferably is oriented with a slight angle of inclination upwardly from a substantially horizontal plane normal to the vertical longitudinal axis 22, suitably from about three to about six degrees. Of course, other angles may be used with equal facility. Preferably, the liquid injection assembly includes a liquid injection mechanism, schematically illustrated as pump 93, which causes the nozzle to spray the liquid phase tangentially onto the cylindrical inner surface 74 and to form the desired cylindrically rotating film. Accordingly, inlet 70 provides an effective approach for introducing rotating film 71 non-disruptively and non-dispersively through opening 80, such that it traverses along the inner cylindrical surface 14 of the outer cylindrical member 12 to a liquid outlet, generally indicated as 94, positioned adjacent to outer cylindrical member second end 20.

Referring to FIG. 8, liquid inlet 70 may further include a regulatable opening 77 positioned at the closed first end 76 of cylindrical member 72 for introducing desired amounts of preselected materials, which may conveniently be a surface tension-decreasing liquid, such as oleic acid or other known materials. The materials introduced through opening 77 enter the liquid inlet chamber 75 where they may combine with the liquid phase and collectively form the rotating film 71 on the inner cylindrical surface 14 of outer cylindrical member 12. The particular materials introduced into opening 77 may be selected based upon, for example, the nature of the liquid phase and the process temperature.

As shown in FIGS. 1 and 3, liquid outlet port 94 is formed in the sidewall portion of cylindrical member 12 adjacent to its second end 20 for exhausting a substantial portion of the liquid phase and impurities resulting from the particular process. In a typical distillation process of a grape wine, for example, liquid outlet 94 may exhaust water with impurities from the wine, including essential oils. The exhausted materials flow from outlet port 94 through conduit 96. In order to prevent leaking of the gaseous phase together with the residual liquid phase, a conventional gas trap mechanism 97 may be connected to outlet port 94 via conduit 96 for capturing at least a substantial portion of the gaseous phase that may be carried through outlet 94.

Apparatus 10 also includes a gas inlet, generally indicated as 98, which in the preferred embodiment is illustrated as a relatively short cylindrical member 99, for introducing a cylindrically rotating gaseous phase that helically traverses from an open upper end 100 of gas inlet 98 into the annular chamber 26 to a position adjacent the first end 18 of outer cylindrical member 12. The gaseous phase, indicated as dashed arrow 101, rotates in the same angular direction as and in axial countercurrent to the rotating film 71, such that rotating gaseous phase 101 engages at least a substantial portion of the rotating film 71 to form a product. The term countercurrent, as used in herein, refers to an opposed axial movement of the gaseous phase 101 and rotating film 71 within apparatus 10, which directions are indicated by the respective solid and dashed arrows. The particular product resulting from contact of the phases will be based upon the selection of the liquid phase and the gaseous phase that are introduced into apparatus 10 as well as environmental conditions thereof. The term gaseous phase shall include, but not be limited to gas, vapor or mist, which may comprise particles, substances, compositions in addition thereto, as well as may comprise a plurality of different gases.

Preferably at least a portion of the cylindrical member 99 extends from the outer cylindrical member second end 20 a predetermined distance beyond the liquid outlet 94 concentrically within and coaxial with the outer cylindrical member 12 and terminates in open end 100. The second end 102 of short cylindrical member 99 is positioned beyond outer cylindrical member second end 20, with the second end 20 sealingly attached to and enclosing the outer surface of short cylindrical member 99 intermediate its first and second ends 100 and 102. Short cylindrical member 99 also has a cylindrical inner surface 104 that is substantially parallel to the outer cylindrical member inner surface 14. In addition, short cylindrical member 98 has a diameter smaller than the diameter of outer cylindrical member 12, with the ratio of diameters of member 98 and member 12 suitably ranging from about 0.5 to about 0.75, and preferably about ⅔.

A gas inlet port 106 is disposed in the sidewall portion of short cylindrical member 99 and is coupled to a conduit 108 through which pressurized gaseous phase or vapor flows from a source (not shown). The gaseous phase is injected, suitably by a nozzle as described with respect to FIGS. 6 and 7, substantially tangentially along the inner surface 104 of short cylindrical member 98. A substantial portion of the injected gaseous phase helically flows from the open end 100 of short cylindrical member 99 into the first annular chamber 26, rotating in the same direction as and in countercurrent to the first rotating film described above. A substantial portion of rotating gaseous phase 101 engages rotating film 71 within the narrow annular chamber 26 to form a desired product, a substantial portion of which is carried with the gaseous phase to a gas outlet 110 positioned proximal to outer cylindrical member first end 18. Gas outlet 110 has a discharge port 111 disposed in the outer cylindrical member sidewall portion intermediate liquid inlet 70 and the outer cylindrical member first end 18, preferably adjacent first end 18. The materials exhausted through discharge port 111 may conveniently be passed through a conduit 112 provided with a valve 114 for regulating and controlling the outgoing flow of materials to peripheral equipment, which may be combined with the exhausted materials of other similar apparatus or be sent to peripheral equipment.

Because the gaseous phase and the rotating film rotate in the same direction, either clockwise or counter-clockwise, the centrifugal effect from the high speed of the rotating gas 101 pressing on the surface of the rotating film 71 increases the rotational velocity of the liquid. Furthermore, the centrifugal forces of the gaseous phase pressing on the rotating film also enhances the contact between the liquid phase and the gaseous phase, thereby improving reactions or the exchange of materials between the liquid and gaseous phases.

FIGS. 9, 10 and 11 illustrate an alternative preferred embodiment of the apparatus of the present invention, generally indicated as 210, which comprises a plurality of adjacent cylindrical members 212a, 212b, 212c, 212d, all positioned concentrically around and substantially coaxial with the inner cylindrical member 212a. Adjacent pairs of cylindrical members, namely pairs 212a and 212b, 212b and 212c, and 212c and 212d, are spaced respective predetermined distances apart to define elongated annular chambers 215, 217 and 219 between at least a substantial portion of each respective pair of adjacent cylindrical members. Accordingly, the diameter of each cylindrical member generally increases in size from inner cylindrical member 212a to outer cylindrical member 212d. Each cylindrical member 212a, 212b, 212c and 212d also includes a respective inner cylindrical surface 214a, 214b, 214c, and 214d, at least a substantial portion of which is substantially parallel to axis 211. As with the embodiment described with respect to FIG. 1, each cylindrical member 212a, 212b, 212c, and 212d, has a respective first end 216a, 216b, 216c, and 216d, a respective second end 218a, 218b, 218c, 218d, and a cylindrical sidewall portion extending between the respective first and second ends. A liquid outlet, generally indicated as 220, includes a liquid outlet port 222 disposed in the sidewall of outer cylindrical member 212d adjacent its second end 218d. The outlet port 222 is connected to a conduit 224 to provide an exit for the passage of residual liquids resulting from the liquid phases introduced into each of the cylindrical members 212a, 212b, 212c and 212d. A device 226 for capturing escaped vapor or gas also may be attached to conduit 224 to prevent the leaking or escape of the gaseous phase together with the exiting residual materials.

Apparatus 210 also includes at least one liquid inlet 228d disposed in the sidewall portion of cylindrical member 212d. Depending upon the particular process and the desired capacity of apparatus 210, a plurality of liquid inlets 228b, 228c and 228d may conveniently be disposed in each respective sidewall portion of respective cylindrical members 212b, 212c and 212d proximal to its first end 216b, 216c and 216d. While three liquid inlets are shown in FIG. 9, it will be apparent to those skilled in the art that a greater number of concentric cylindrical members with appropriate liquid inlets is fully within the scope of the present invention. Each liquid inlet 228b, 228c and 228d may be substantially similar to liquid inlet 70 shown and described with respect to FIGS. 1 and 6–8. Accordingly, each liquid inlet 228b, 228c and 228d may provide a liquid phase rotating in a common predetermined direction along each respective cylindrical member inner surface 214b, 214c and 214d, which defines a rotating film of the liquid phase, generally indicated as solid arrows 230b, 230c and 230d, along inner surfaces 214b, 214b and 214c and 214d of each respective chamber 215, 217 and 219. In the embodiment of FIG. 9, each rotating film 230b, 230c and 230d traverses the length of each respective chamber 215, 217 and 219 from the respective liquid inlet 228b, 228c and 228d to the respective second end 218b, 218c and 218d thereof. The falling rotating films 230b, 230c and 230d exit chambers 215, 217 and 219 and then are urged against the outer cylindrical member inner surface 214d due to the centrifugal forces of rotation, which residual liquids and any resulting impurities collectively may exit through outlet 220.

Apparatus 210 also includes a gas inlet 232, which may be substantially similar to gas inlet 98 described with respect to FIG. 1. Gas inlet 232 is positioned proximal to the second end 218d of the outer cylindrical member 212d and is coupled to a conduit 233 for introducing a preselected gaseous phase that helically traverses from the gas inlet 232 into each respective annular chamber defined by adjacent pairs of cylindrical members. A significant portion of the rotating gaseous phase, indicated as dashed arrows 234b, 234c and 234d, enters each annular chamber 215, 217 and 219 and traverses the length of each chamber 215, 217 and 219 in countercurrent to each rotating film 230b, 230c and 230d, flowing to a position adjacent to the first end 216b, 216c and 216d of each respective cylindrical member 212b, 212c and 212d. The gaseous phase 234b, 234c and 234d also rotates within each respective chamber 215, 217 and 219 in the same direction as respective rotating films 230b, 230c and 230d, such that a substantial portion of the gaseous phase 234b, 234c and 234d within each elongated annular chamber 215, 217 and 219 engages at least a substantial portion of the rotating film 230b, 230c and 230d to form a desired product or cause an appropriate reaction. In the preferred embodiment of FIG. 9, gas outlets 240, 242 and 244 are disposed in each respective cylindrical member 212b, 212c and 212d adjacent to its respective first end 216b, 216c and 216d for exhausting at least a portion of the remaining gaseous phase 234b, 234c and 234d and a substantial portion of the product, collectively indicated as dashed arrows 241, 243 and 245, respectively. The collective materials 241, 243 and 245 are exhausted from each outlet 240, 242 and 244 through a respective conduit 248, 250 and 252, the quantity of exhausted materials 241, 243 and 245 suitably being controlled by a respective regulator valve 254, 256 and 258.

FIG. 12 illustrates yet another alternative preferred embodiment of the apparatus of the present invention, generally indicated as 300, formed of a plurality of concentric and substantially coaxially cylindrical members, indicated as 302a, 302b, 302c, 302d, and 302e, with the diameter of each cylindrical member increasing in size from the inner cylindrical member 302a to the outer cylindrical member 302e. As with the preferred embodiment illustrated in FIG. 9, each cylindrical member includes a first end 304a, 304b, 304c, 304d and 304e, a second end 306a, 306b, 306c, 306d, 306e, with the second end 306e of the outer cylindrical member 302e being closed. The second end 306a of inner cylindrical member 302a terminates in a conical portion spaced apart from gas inlet 322. Of course, the second end 306a of inner cylindrical member 302a might also be connected to an appropriate conduit, such as in FIG. 1, that extends through gas inlet 322 for the passage of fluids. Adjacent pairs of cylindrical members are spaced respective predetermined distances apart to define elongated annular chambers 308, 310, 312, 314 and 316 between a substantial portion of each adjacent pair of cylindrical members 302a, 3302b, 302c, 302d and 302e, with the interior volume of inner cylindrical member 302a defining a central chamber 308. Liquid inlets 318b, 318c and 318e, which may be substantially identical to that described with respect to FIG. 1, are disposed in cylindrical members 302b, 302c and 302e, respectively, adjacent to each respective first end 304b, 304c and 304e for introducing the desired rotating film along the inner surface of respective cylindrical members 302b, 302c and 302e. Each rotating film traverses the length of each respective chamber 310, 312, and 316 and, upon reaching the lower end of each chamber, the remaining liquids collect against the inner surface of outer cylindrical member 302e, with the residual materials collectively exiting at liquid outlet 320. Liquid outlet 320 is disposed in outer cylindrical member 302e adjacent to outer cylindrical member second end 306e. The gaseous phase is introduced at gas inlet, generally indicated as 322, which may be substantially identical to that described with respect to FIG. 1, for providing a rotating gaseous phase or vapor that helically traverses within chambers 310, 312, and 316 rotating in the same angular direction as the rotating liquid phases. Chambers 310, 312 and 316 define contact chambers in which phase contact occurs, such as for providing a reaction, heat transfer or an exchange of materials.

Central chamber 308, defined by cylindrical member 302a, and chamber 314, defined by cylindrical members 302c and 302d, define thermal chambers into which fluids, suitably heating fluids or refrigerating fluids, having predetermined temperatures may circulate in order to influence the product formed or the reaction resulting from the gaseous phase engaging the liquid phase within contact chambers 310, 312 and 316. While thermal chambers 308 and 314 are illustrated as containing fluid within the entire volume thereof, each such chamber 308 and 314 may also include a selectively moveable partition substantially similar to that shown and described with respect to FIGS. 4 and 5. Accordingly, by varying the position of such partitions within the thermal chambers, the circulating refrigerating or heating fluids within a section of the volume of the thermal chambers 308 and 316 may affect the reactions between the gaseous and liquid phase within the contact chambers. For simplicity of illustration, the inlets and outlets for both the liquid phase and the gaseous phase are schematically shown in FIG. 12 by respective solid and dashed arrows.

Figure 13:
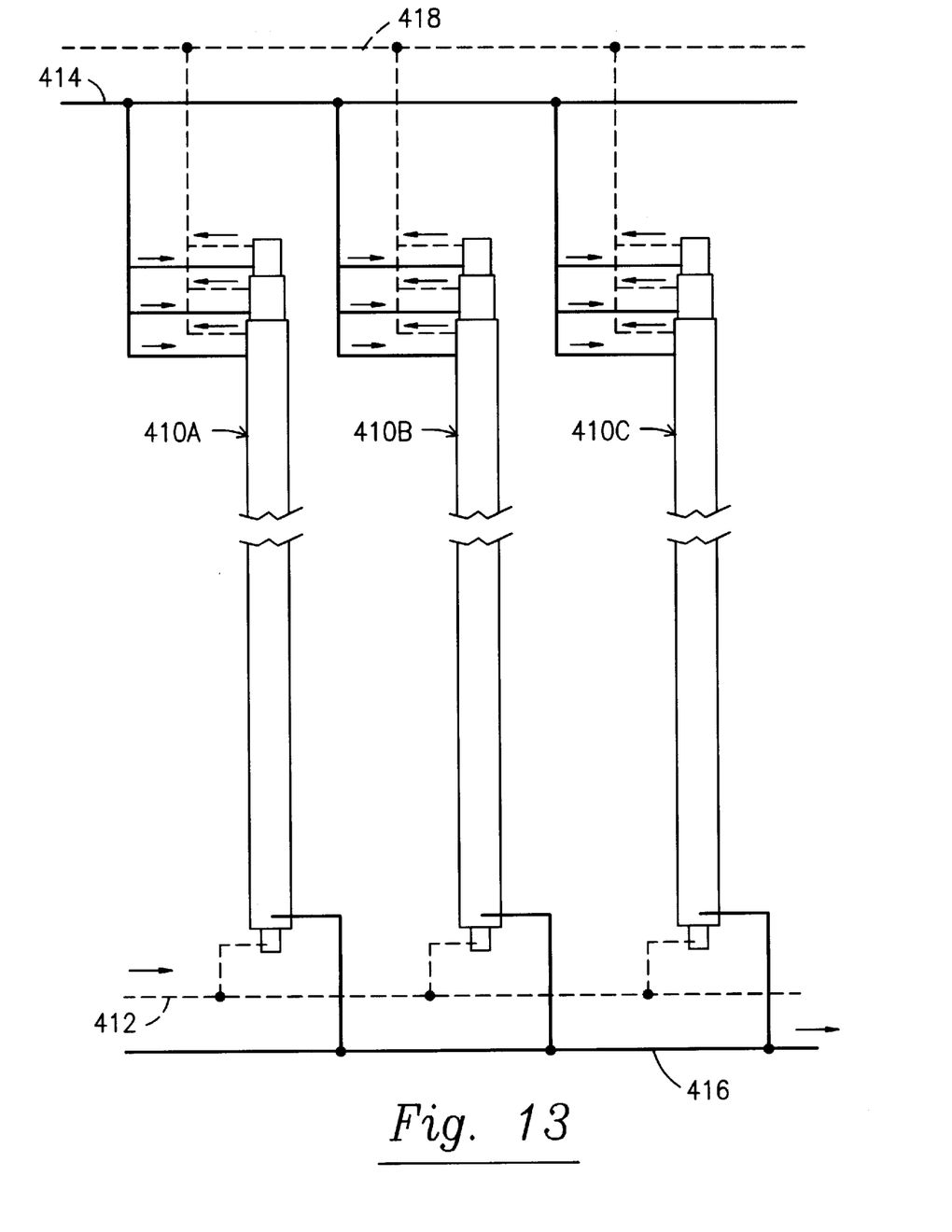
FIG. 13 is a schematic representation of a system according to the present invention, illustrating three units of the apparatus connected in a parallel arrangement.

FIG. 13 illustrates a schematic representation in which a system formed of multiple units of the apparatus according to the present invention, generally indicated as 410a, 410b and 410c, are connected in a parallel arrangement in order to increase the capacity of the present invention. For simplicity of illustration, the liquid phases and gaseous phases, respectively, are shown by solid and dashed arrows. In this particular system the gaseous phase is fed from a common source 412, which may be fed into each apparatus 410a, 410b and 410c in accordance with the present invention. Similarly, a liquid phase may also be introduced from a single source 414 into one or more cylindrical members of each apparatus 410a, 410b and 410c to form the desired rotating film along the outer wall inner surface of the individual chambers. Of course, the apparatus 410a, 410b and 410c as well as each gas and liquid inlet thereof may have its own individual source instead of a common source. As set forth herein, the gaseous phase and the liquid phase rotate in the same angular direction within contact chambers and in opposite axial directions, engaging one another to form a desired product, to cause a reaction or to exchange materials. The residual liquid phase exits each apparatus 410a, 410b and 410c at outlet passage 416. The remaining gaseous phase and any resulting products may exit each apparatus and combine in a common conduit 418, which may be coupled to associated processing equipment.

The capacity of a system or apparatus according to the present invention may conveniently be increased by increasing the length of the elongated cylindrical members as well as increasing the number of concentric cylindrical members comprising each apparatus. In addition, the capacity of a given apparatus may also be modified by controlling appropriate inlet valves to increase, reduce or even preclude the quantity of liquid phase introduced into preselected chambers of such apparatus. The capacity may also be modified by adjusting appropriate outlet valves to reduce, increase or prevent the gaseous phase exiting from a preselected a chamber. Thus, an advantage of the present invention is its versatility and the ease in which the capacity of the system can be selectively adjusted.

Certain processes, such as alcohol rectification, require two separate stages, where a volatile component must be concentrated and then exhausted. A preferred embodiment in accordance with the present invention of a suitable apparatus for performing two stages in a serial arrangement is illustrated in FIG. 14, with the exhaustion stage identified as reference character "A" and the concentration stage by character "B". This preferred embodiment employs the selectively moveable partition as described herein. For simplicity of illustration, the apparatus of FIG. 14, generally indicated as 500, utilizes a single pair of concentric and adjacent cylindrical members 502 and 504, with the inner member 502 having a frusto-conical portion 506 positioned proximal to gas inlet 508 to guide the rotating gaseous phase, indicated by the dashed arrows 510, into the substantially narrow and elongated annular chamber 512 defined by the sidewall portions of cylindrical members 502 and 504. The gaseous phase is provided to gas inlet 508 through a conduit 509, which is coupled to an appropriate source of pressurized gas or vapor.

The separation between stages A and B is generally marked by the location of the liquid inlet assembly, generally indicated as 514. The preferred embodiment of such liquid inlet assembly 514 may be essentially identical to that shown and described with respect to FIGS. 6–8, which may include one or more injection nozzles having a preselected outlet diameter for introducing the liquid phase that forms the desired rotating film, generally indicated as solid arrows 516. An additional liquid phase may be introduced at inlet 518 disposed in the outer cylindrical member 504 adjacent its upper end for introducing a rotating film, which additional liquid phase may be reflux from this apparatus or another conventional source. The upper portion of the interior volume of the inner cylindrical member 502 that contains the circulating fluids, which for the concentration phase B are refrigerating liquids, acts as an interior condenser 520. The length of interior condenser 520 may be determined by the positioning of partition 522 by adjusting moveable conduit 523 along longitudinal axis 519. Moveable conduit 523 also may be used for introducing or removing circulating fluids, such as through opening 524, to maintain interior condenser at a predetermined temperature. An additional conduit 526 may be used to complement the function of conduit 523 by adding or removing circulating fluids as necessary. The reflux introduced at inlet 518 supplements the effect of the interior condenser 520, which may be necessary to obtain a very high concentration in the intended distillate. In accordance with the present invention, the apparatus of FIG. 14 provides for the rotating gaseous phase 510 to engage the rotating film of the liquid phase 516 and, if desired, the rotating reflux, with the gaseous phase and desired products traversing towards the gas outlet 524 positioned above the reflux liquid inlet assembly 518, such that a substantial portion of the gaseous phase and product condense within the concentration portion B due to the cooling of interior condenser 520. The gaseous phase and condensed product are exhausted through outlet 528, which may be passed to a conventional condenser (not shown) or other appropriate related equipment. The residual liquid may exit apparatus 500 through liquid outlet 530 positioned adjacent the lower end of outer cylindrical member 504. It will be apparent to those skilled in the art that the use of inlet 518 may not be necessary, such as where interior condenser 520 causes sufficient reflux to form within the concentration portion B of apparatus 500. A conventional external condenser (not shown) may also be used to improve the effect of concentration portion B.

Figure 15:
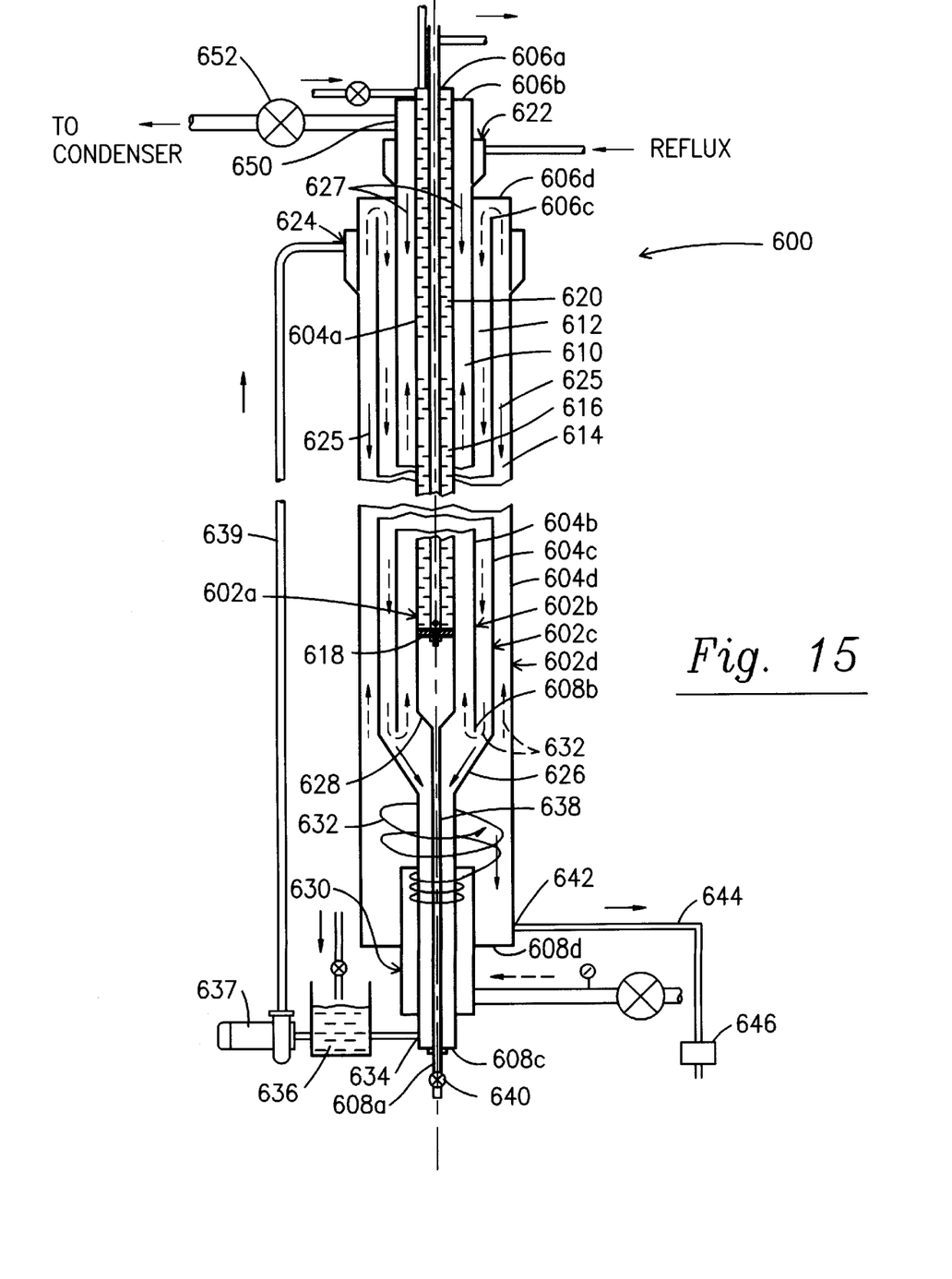
FIG. 15 is an alternative embodiment of the apparatus of the present invention, illustrating more than one process occurring within parallel chambers of an apparatus in accordance with the present invention.

Another preferred embodiment of the apparatus of the present invention, generally indicated as 600, is shown in FIG. 15 in which two stages of a process may be achieved by arranging such stages, suitably concentration and exhaustion, in parallel chambers of apparatus 600. The preferred embodiment of apparatus 600 shown in FIG. 15 is formed of a plurality of concentric and substantially coaxial elongated cylindrical members 602a, 602b, 602c and 602d, with the diameter of each cylindrical member 602a, 602b, 602c and 602d generally increasing in size from an inner cylindrical member 602a to the outer cylindrical member 602d. Each cylindrical member 602a, 602b, 602c and 602d includes a cylindrical sidewall portion 604a, 604b, 604c and 604d, respectively, extending between respective first and second ends 606a, 606b, 606c, and 606d and 608a, 606b, 606c and 606d, with at least a substantial portion of the length of each cylindrical member sidewall portion 604a, 604b 604c and 604d being substantially parallel and spaced respective predetermined distances apart to define respective elongated annular contact chambers 610, 612 and 614. More specifically, annular chamber 610 is defined by cylindrical sidewall portions 602a and 602b, chamber 612 is defined by cylindrical sidewall portions 604b and 604c, and chamber 614 is defined by cylindrical sidewall portions 604c and 604d. The interior volume of cylindrical member 602a defines a central chamber 616, which includes a selectively moveable partition 618 for creating a predetermined volume 620 through which refrigerating or heating fluids may circulate. The construction of partition 618 may be substantially similar to that shown and described with respect to FIGS. 4 and 5.

This particularly preferred embodiment includes liquid inlet assemblies 622 and 624 disposed in cylindrical sidewall portions 604b and 604d, respectively, for introducing a preselected liquid phase as a rotating film, indicated as solid arrows 625 and 627, respectively, along the inner cylindrical surface of the respective cylindrical members 602b and 602d. The particular liquid introduced at inlet 622 may be reflux from this or another source and, depending on the capacity of internal condenser 620 and the particular process, may not be necessary. In addition, the lower portion of cylindrical members 602c and 602a includes respective frusto-conical portions 626 and 628, with the frusto-conical portions tapering from a respective first predetermined diameter to a respective smaller second predetermined diameter, which is maintained from each respective frusto-conical portion 626 and 628 to the respective cylindrical member second end 608c and 608a. Second ends 608a and 608c both preferably extend beyond the gas inlet, generally indicated as 630.

Gas inlet 630 introduces a rotating gaseous phase that helically flows from gas inlet 630 along frusto-conical portion 626 and is urged into chamber 614 rotating in the same angular direction as and axially moving in countercurrent to the rotating film 625 that is introduced into chamber 614 by liquid inlet 624. The pressurized rotating gaseous phase, indicated as the dashed arrow 632, helically flows upwardly through chamber 614 and into chamber 612 through the opening between first end 606c and first end 606d. Because no gas outlet is positioned at the first end 606d of cylindrical member 602d, the gaseous phase flows within chamber 612 toward second end 608b of cylindrical member 602b. Once it reaches second end 608b, because the pressurized gaseous phase is lighter, at least a substantial portion of the gaseous phase enters chamber 610 at the opening between second end 608b and the frusto-conical portion 626. However, rather than the liquid phase that was carried upwardly within chamber 614 moving with the gaseous phase within chamber 610, at least a substantial portion of such liquid phase is exhausted by flowing along the inner surface of frusto-conical portion 626 to the liquid outlet 634 disposed in the sidewall portion of cylindrical member 602c adjacent its second end 608c. Within chamber 610, the helically flowing gaseous phase 632 may engage the additional rotating film 627 formed by liquid inlet 622 introducing the rotating liquid phase along the inner cylindrical surface of cylindrical member 602b. The liquid exhausted through liquid outlet 634 is collected in a reservoir 636 that is also fed by a source of the desired liquid phase, which may conveniently be pumped by pump 637 through conduit 639 to liquid inlet 624. This liquid phase then forms rotating film 625.

By selecting an appropriate liquid phase and an appropriate gaseous phase, the contacting phases may form an appropriate product, result in a chemical reaction, physical transfer, heat transfer or a combination thereof. In the preferred embodiment shown in FIG. 15, a refrigerating liquid is conveniently introduced within the selectable predetermined volume 620 of central chamber 616 resulting in the concentration stage within a desired portion of chamber 610. The liquid introduced into the volume 620 may conveniently be exhausted through the conduit 638 extending from frusto-conical portion 628, as controlled by appropriate regulation of valve 640. The portion of rotating film 625 that is not carried from chamber 614 into chamber 612 by the rotating gaseous phase 632 exits through outlet 642 disposed in the cylindrical sidewall portion 604d adjacent second end 608d. Liquid outlet 642 is coupled to conduit 644 that is provided with a conventional mechanism for trapping or collecting gas and/or vapor that may escape with the exiting liquid.

With the preferred embodiments of the structure of the present invention described above, it will be apparent to those skilled in the art that such apparatus provides an effective method for placing a gaseous phase in contact with a liquid phase, and may be applicable to numerous industrial processes, including but not limited to, distillation-rectification, absorption, concentration, refrigeration, humidification and dehumidification, among others. Each of the preferred embodiments illustrated in FIGS. 1–15 operate by introducing a liquid phase tangentially on the inner surface of at least one cylindrical member by a liquid inlet positioned proximal to the first or upper end of such cylindrical member. Accordingly, the liquid phase forms a rotating film along the inner surface of the cylindrical member, or members, where it was introduced, such that the rotating film traverses along the inner surface of the cylindrical member from the liquid inlet at least substantial portion of the length of the cylindrical member. Each apparatus also operates by introducing a rotating gaseous phase that helically flows within at least one chamber defined by an adjacent pair of cylindrical members. The narrow annular chambers maintain the gaseous phase in close proximity to the liquid phase, thereby increasing phase contact. The gaseous phase rotates in the same direction as and moves in countercurrent to the rotating film, and engages at least a substantial portion of the rotating film by pressing against it by the centrifugal effect caused by the rotation by the gaseous phase. The phase contact may form a product, result in a reaction, provide heat transfer or a combination of two or more of these results. At least a substantial portion of the gaseous phase and a portion of the product caused by the contact between the liquid phase and gaseous phase are exhausted through an outlet positioned generally adjacent the upper end of one of the cylindrical members. The overall process may be enhanced by repeatedly and intermittently injecting the liquid phase in a synchronized rhythmical manner, suitably about a 1 second cycle with a 15% inactive period and an 85% active period, to vary the flow of rotating films along the inner cylindrical surfaces of the members.

In one illustrative process, utilizing the apparatus 210 shown in FIG. 9, a liquid phase of a low concentration mixture of water and alcohol, about 10% volume of alcohol of a wine-like mixture, was distilled to obtained a distillate of approximately 50% alcohol. In order to achieve these results the apparatus 210 was constructed with dimensions of the cylindrical members 212a–d as set forth in Table 1.

TABLE 1

| Cylindrical Member | Outer Diameter | Inner Diameter | Length |
|---|---|---|---|
| 212d | 101.6 mm | 97.6 mm | 5.650 mm |
| 212c | 76.2 mm | 72.2 mm | 5950 mm |
| 212b | 50.8 mm | 46.8 mm | 6250 mm |
| 212a | 22.2 mm | 18.2 mm | 6500 mm |

With the apparatus being dimensioned as set forth above, the surface area of the outer cylindrical sidewall of each adjacent chamber 215, 217 and 219 will be as set forth in Table 2.

TABLE 2

| Chamber | Outer Wall Surface Area | Percent of Total Area |
|---|---|---|
| 219 | 1.732 m$^2$ | 43.3% |
| 217 | 1.350 m$^2$ | 33.7% |
| 215 | .918 m$^2$ | 22.9% |

The amount of liquid phase that enters annular chambers 215, 217 and 219, the type of the liquid that will be introduced and the particular operation to result from the contact of the gaseous phase 234b, 234c and 234d by the rotating film 230b, 230c and 230d depend generally upon the total surface area in which the liquid phase will move. This proportional quantity, which may conveniently be established experimentally or by calculation, depends on the liquid inlet pressures and the outlet area of the selected nozzles. The proportional amount of gaseous phase that will be introduced into the apparatus in relation to the amount of liquid phase, may also be determined by calculations or experimentally. One advantage of the present invention is that, after the quantity and pressure of the liquid and vapor or gas have been determined for the total number of chambers, it is possible to adjust the quantity and pressure for each individual chamber 215, 217 and 219. The quantity and pressure of the gas or vapor should be proportional to the liquid phase introduced within each liquid inlet 228b, 228c, and 228d. In order to obtain appropriate corresponding values, the volume of vapor or gas leaving each chamber through gas outlets 240, 242, and 244 should be regulated, such as by regulator valves 254, 256 and 258. The resulting materials 241, 243 and 245 exiting respective gas outlets 240, 242 and 244 may be combined in conduit 246, which may provide passage to associated processing equipment, suitably including a condenser.

In order to achieve the results set forth above, a wine-like mixture was fed through conduit 254, suitably by an appropriate pump or other conventional liquid phase feeding mechanism, at a rate of about 1,722 liters per hour, with about 746 liters per hour being fed through liquid inlet 228d, about 581 liters per hour being fed into inlet 228c and about 395 liters per hour fed into inlet 228b. These rates were obtained by utilizing nozzles, such as those shown in FIGS. 4 and 5, in which the nozzle diameters varied for each chamber. Specifically, the nozzle for 228d had an exit diameter of about 2.25 mm, the nozzle at inlet 228c had an exit diameter of about 2.00 mm, and inlet 228b had a nozzle with an exit diameter of about 1.50 mm. The particular results identified above occurred where the wine-like mixture was fed at about 65° C., with the apparatus not being insulated and where the final residue did not have any alcohol content.

The approximate quantity of gas or vapor may conveniently be adjusted, as the system operates in a stable manner. For this particular example, the total amount of vapor, which in this example was steam, that entered the apparatus tangentially to the sidewall of the gas inlet chamber 232 entered through a 6.0 mm diameter nozzle at a pressure of about 6 ATM. Of the helical flow of the gas from inlet 232 into chambers 215, 217, and 219, approximately 43.3% of the total gaseous phase entered chamber 219, approximately 33.7% entered chamber 217 and approximately 22.9% entered chamber 215. This resulted in apparatus 210 forming a distillate at a rate of about 335 liters per hour having an alcohol content of about 51.2% expressed in volume, with about 0% residual liquid. The steam consumption of the apparatus was about 326 kgs/hour, which was determined by adding the liters of distillate plus the liters of residual liquid and subtracting therefrom the liters of the wine-like mixture fed into the apparatus.

The preferred apparatus 500 shown in FIG. 14 has been used to obtain a distillate of about 93% alcohol content in volume by distilling a low concentration of a hydroalcoholic mixture of about 50.9% alcohol, without alcohol content in the residue. In order to achieve these results the elongated annular chamber 512 had a length of about 10.40 m, of which about 5.65 m were used for exhausting (identified as reference "A") and about 4.75 m were used for concentration (indicated as reference "B"). Partition 522 was positioned approximately 1 meter above the liquid inlet where the liquid phase of the hydroalcoholic mixture is fed into chamber 512 to form rotating film 516. A refrigerating liquid, suitably water, entered chamber 520 at a rate of about 4.9 liters per hour at 9° C. and exited the base of condenser through the partition at a temperature of about 51° C. The circulating fluid then exited the apparatus through the lower portion of the inner cylindrical member. The refrigerating liquid within the interior condenser 520 enabled the interior condenser 520, having a transition area of about 1.1 m$^2$, to partially condense the steam and product going upwardly through chamber 512. In order to obtain a distillate of about 93% alcohol in volume, the liquid phase was fed at the rate of about 78 liters per hour of a hydroalcoholic low concentration mixture, such as the resulting distillate material obtained from the process described herein with respect to FIG. 9, of about 50.9% alcohol in volume through a nozzle having an exit diameter of about 1.5 mm and at a pressure of about 2 ATM. No liquid phase was introduced into inlet 518 for this particular experiment. The vapor in the form of steam entered the gas inlet 508 through a nozzle having an exit diameter of about 4.5 mm at about 6 ATM to form the distilled liquid having an alcohol concentration of about 93.2% expressed in volume. It will be apparent to one skilled in the art that in order to increase the resulting concentration of the distillate, the condenser tube may be lengthened, such as by moving partition 522 towards the frusto-conical portion 506, additional reflux may be introduced at inlet 518, or the reflux within stage B may be further increased, such as by using a conventional external condenser.

Numerous variations and modifications of the present invention, all within the scope of this invention, will readily occur to those skilled in the art. All such modifications and variations are considered to be fully within the scope of this invention. Accordingly the foregoing detailed description is to be considered illustrative only of the principles of the invention and is not to be limitative thereof. The scope of this invention is to be determined solely by the claims appended hereto.

What is claimed:

1. An apparatus for placing a substantially gaseous phase in contact with a substantially liquid phase, said apparatus comprising:

a first elongated cylindrical member having a predetermined diameter, an inner cylindrical surface, an outer cylindrical surface, a first end, a closed second end spaced apart from said first end and a longitudinal axis extending through said first and second ends;

a second elongated cylindrical member having a longitudinal axis and a diameter smaller than said first cylindrical member diameter, said second cylindrical member being positioned concentrically within and coaxial with said first cylindrical member to define a first elongated annular chamber between said first cylindrical member and said second cylindrical member, said second cylindrical member having first and second ends spaced apart a distance at least equal to the distance between said first cylindrical member first and second ends, and said second cylindrical member having an inner cylindrical surface and an outer cylindrical surface, with at least a portion of said second cylindrical member outer surface being substantially parallel to and spaced a predetermined distance apart from said first cylindrical member inner surface;

a first liquid inlet disposed in said first cylindrical member proximal said first cylindrical member first end for providing a first liquid phase cylindrically rotating in a predetermined direction along said first cylindrical member inner surface to define a first rotating film, with a substantial portion of said first rotating film traversing the length of said first cylindrical member from said first liquid inlet to a position adjacent said first cylindrical member second end;

a liquid outlet port disposed in said first cylindrical member adjacent to said first cylindrical member second end through which a substantial portion of said first liquid phase may exit said first cylindrical member;

a third cylindrical member having an open first end, a second end, an axis extending therebetween, a cylindrical inner surface and a diameter smaller than said first cylindrical member diameter, a least a portion of said third cylindrical member extending from said first cylindrical member second end concentrically within and coaxial with said first cylindrical member, with said third cylindrical member first end positioned a predetermined distance beyond said liquid outlet port, said third cylindrical member having a cylindrical inner surface substantially parallel to said first cylindrical member inner cylindrical surface;

a gas inlet port disposed in said third cylindrical member proximal said first cylindrical member second end for injecting a gaseous phase substantially tangentially along said inner surface of said third cylindrical member, such that a substantial portion of said injected gaseous phase helically flows from said third cylindrical member into said first annular chamber, cylindrically rotating in the same angular direction and in axial countercurrent to said first rotating film, to a position adjacent said first cylindrical member first end, with a substantial portion of said gaseous phase engaging said first rotating film to form a first product; and a first discharge port positioned proximal said first cylindrical member first end intermediate said first liquid inlet and said first cylindrical member first end for exhausting at least a portion of said gaseous phases and at least a substantial portion of said first product.

2. An apparatus according to claim 1, wherein said second cylindrical member has an axial length greater than said first cylindrical member.

3. An apparatus as in claim 1 wherein the ratio of the diameter of said third cylindrical member and the diameter of said first cylindrical member diameter is between about 0.5 and 0.75.

4. An apparatus as in claim 1 wherein said first liquid inlet further comprises a cylindrical member having a cylindrical inner surface, a closed first end, a second end, and a diameter greater than said first cylindrical member diameter, said first liquid inlet cylindrical member being positioned concentrically around and coaxial with a portion of said first cylindrical member proximal to said first cylindrical member first end, and said second end of said first liquid inlet cylindrical member attached to said first cylindrical member for providing said first rotating film substantially non-disruptively from said first liquid inlet cylindrical member inner cylindrical surface to said first cylindrical member inner cylindrical surface.

5. An apparatus according to claim 4, wherein said first liquid inlet first end further comprises a regulatable passage for providing preselected materials into said first cylindrical member.

6. An apparatus according to claim 4 further comprising:

a first liquid inlet port disposed in said first liquid inlet cylindrical member proximal said first end of said first liquid inlet cylindrical member for introducing said first liquid phase substantially tangentially in said predetermined direction along said inner cylindrical surface of said first liquid inlet cylindrical member to form said first cylindrically rotating film.

7. An apparatus as in claim 1 wherein said third cylindrical member outer surface is attached to said first cylindrical member closed second end, with said third cylindrical member first end being spaced a predetermined distance beyond said liquid outlet port.

8. An apparatus as in claim 1 wherein said second cylindrical member further comprises a generally frusto-conical portion positioned intermediate said second cylindrical member first and second ends, said frusto-conical portion tapering from a first predetermined diameter at a position proximal said second cylindrical member first end and to a smaller second predetermined diameter at a position proximal said second cylindrical member second end, which second predetermined diameter of said second cylindrical member is maintained from said frusto-conical portion to said second cylindrical member second end.

9. An apparatus as in claim 1 further comprising a liquid injection assembly coupled to said first liquid inlet for providing said first rotating film at a predetermined flow rate for a predetermined period of time.

10. An apparatus as in claim 9 wherein said liquid injection assembly comprises a liquid injection mechanism for repeatedly and intermittently introducing said first rotating film along said first cylindrical member inner surface at a preselected rate for a predetermined time period.

11. An apparatus as in claim 1 further comprising a central chamber within said second cylindrical member into which may be introduced a third liquid phase having a predetermined temperature.

12. An apparatus according to claim 11 further comprising a partition selectively moveable within said central chamber to form a predetermined volume for circulating said third liquid phase within said predetermined volume of said central chamber.

13. An apparatus according to claim 12 wherein said partition forms a substantially liquid-tight seal with said inner cylindrical surface of said second cylindrical member.

14. An apparatus according to claim 13 wherein said member comprises a generally flat disk.

15. An apparatus as in claim 1 further comprising:
a fourth elongated cylindrical member having a diameter less than said first cylindrical member diameter and greater than said second cylindrical member diameter, said fourth cylindrical member having respective first and second ends and an axis extending therebetween, said fourth cylindrical member positioned concentrically around and coaxial with at least a substantial portion of said second cylindrical member to define a second annular chamber between said fourth cylindrical member and said second cylindrical member, and a substantial part of said fourth cylindrical member being positioned concentrically within and coaxial with said first cylindrical member to define a third annular chamber between said first cylindrical member and said fourth cylindrical member, said fourth cylindrical member having a closed first end positioned intermediate said first liquid inlet and said second cylindrical member first end and an open second end extending from said fourth cylindrical member first end to a position proximal said third cylindrical member first end, said fourth cylindrical member having an inner cylindrical surface spaced a predetermined distance apart from said second cylindrical member outer cylindrical surface and an outer cylindrical surface spaced a predetermined distance apart from said first cylindrical member inner cylindrical surface;
a second liquid inlet disposed in said fourth cylindrical member intermediate said first liquid inlet and said fourth cylindrical member first end for providing a second liquid phase rotating along said fourth cylindrical member inner surface in the same direction as said first rotating film to define a second cylindrically rotating film, with a substantial portion of said second rotating film traversing the length of said fourth cylindrical member from said second liquid inlet to a position adjacent said first cylindrical member second end and exiting at said liquid outlet port, wherein a portion of said gaseous phase enters said third annular chamber rotating in the same direction as and in countercurrent to said first rotating film, such that at least some of said portion of said gaseous phase engages said first rotating film to form said first product, and wherein another portion of said gaseous phase enters said second annular chamber rotating in the same direction as and in countercurrent to said second rotating film, such that at a portion of said gaseous phase engages said second rotating film to form a second product; and
a second discharge port positioned adjacent to said fourth cylindrical member first end for exhausting at least a portion of said another portion of said gaseous phase and at least a substantial portion of said second product.

16. A gas and liquid contact apparatus comprising:
a plurality of concentric and substantially coaxial elongated cylindrical members, each of said plurality of cylindrical members having a diameter, a first end, a second end, a cylindrical sidewall portion extending between said first and second ends, an inner cylindrical surface and an outer cylindrical surface, with adjacent pairs of cylindrical members being spaced respective predetermined distances apart to define an elongated annular chamber between each said adjacent pair of cylindrical members, the diameter of each said cylindrical member generally increasing in size from an inner cylindrical member to an outer cylindrical member;
a liquid outlet port disposed in said outer cylindrical member adjacent said second end of said outer cylindrical member;
a liquid inlet disposed in said sidewall portion of at least one of said cylindrical members proximal the first end of said one cylindrical member for providing a first liquid phase rotating in a predetermined direction along said one cylindrical member inner surface to define a cylindrically rotating film of said liquid phase, said rotating film traversing the length of said one cylindrical member from said liquid inlet of said one cylindrical member to said liquid outlet port;
a gas inlet positioned proximal to said second end of said outer cylindrical member for introducing a cylindrically rotating gaseous phase, such that said gaseous phase helically traverses from said gas inlet into the annular chamber of said rotating film to a position adjacent said first end of said one cylindrical member, said gaseous phase rotating in the same direction as and in countercurrent to said rotating film and engaging at least a substantial portion of said rotating film to form a product;
a gas outlet disposed in said one cylindrical member adjacent to said first end of said one cylindrical member for exhausting at least a portion of said gaseous phase and a substantial portion of said product.

17. An apparatus according to claim 16 wherein said gas inlet further comprises:
a short cylindrical member having
an open first end spaced a predetermined distance beyond said liquid outlet within said outer cylindrical member proximal said outer cylindrical member second end,
a closed second end positioned proximal said outer cylindrical member second end,
a cylindrical inner surface substantially parallel to said cylindrical inner surface of said outer cylindrical member and
a longitudinal axis extending between said short cylindrical member first and second ends, with a portion of said short cylindrical member positioned concentrically within and coaxial with said outer cylindrical member proximal said outer cylindrical member second end, and
a gas inlet port disposed in said short cylindrical member sidewall portion adjacent to said short cylindrical member second end for introducing said gaseous phase tangentially onto said short cylindrical member inner cylindrical surface, such that said gaseous phase flows helically from said short cylindrical member first end rotating in the same direction and in countercurrent to said first rotating film.

18. An apparatus according to claim 16 wherein
an annular chamber formed of said one cylindrical member and the respective cylindrical member adjacent to and having a diameter smaller than said one cylindrical member to define a contact chamber; and an annular chamber adjacent to said annular contact chamber defines a thermal chamber into which fluids having a predetermined temperature may circulate.

19. An apparatus according to claim 16 further comprising:

at least one pair of adjacent cylindrical members define an elongated annular contact chamber through which said rotating film and a portion of said gaseous phase traverse, and at least another pair of adjacent cylindrical members define an annular thermal chamber into which fluids having a predetermined temperatures may circulate, with said thermal chamber being adjacent to said contact chamber, such that fluids circulating within said thermal chamber may influence the product formed from said gaseous phase engaging said liquid phase within said contact chamber.

20. An apparatus according to claim 19 further comprising a partition selectively moveable within said thermal chamber to form a predetermined volume for circulating fluids within said predetermined volume of said thermal chamber.

21. An apparatus according to claim 19 further comprising at least one elongated conduit having a first end positioned outside of said thermal chamber and a second end positioned within said thermal chamber and disposed in said sidewall portion of one of said cylindrical members of said contact chamber at a predetermined position, through which said one conduit reagent materials may be introduced.

22. An apparatus according to claim 19 further comprising at least one elongated conduit having a first end positioned outside of said thermal chamber and a second end positioned within said thermal chamber and disposed in said sidewall portion of one of said cylindrical members of said contact chamber at a predetermined position, through which said one conduit at least a portion of one of said liquid phase and said gaseous phase may be extracted.

23. An apparatus according to claim 16 wherein said inner cylindrical member has an interior volume, and said apparatus further comprises a central chamber formed within said inner cylindrical member defined by said interior volume, into which fluids having a predetermined temperature may circulate.

24. An apparatus according to claim 23 further comprising a partition selectively moveable within said central chamber to form a selectable volume for circulating fluids within said selectable volume of said central chamber.

25. An apparatus according to claim 23 further comprising a conduit having a first end positioned outside said central chamber and a second end positioned within said central chamber and disposed in said sidewall portion said inner cylindrical member at a predetermined axial position, through which conduit preselected materials may be introduced into or withdrawn from the annular chamber adjacent to said central chamber.

26. A method for placing a substantially gaseous phase in contact with a substantially liquid phase in an apparatus comprising a plurality of concentric and substantially coaxial cylindrical members, each of said plurality of cylindrical members having a diameter, a first end, a second end, a cylindrical sidewall portion extending between said first and second ends of each said cylindrical member, each cylindrical member having an inner surface and an outer surface, with adjacent pairs of cylindrical members being spaced respective predetermined distances apart to define an annular chamber between each said adjacent pair of cylindrical members, the diameter of each said cylindrical member generally increasing in size from an inner cylindrical member to an outer cylindrical member, said outer cylindrical member second end being closed, said method comprising introducing a liquid phase tangentially onto the inner surface of at least one cylindrical member and in at least one annular chamber at a liquid inlet positioned proximal to the first end of said one cylindrical member, such that said at least a substantial portion of said liquid phase forms a cylindrically rotating film along the inner surface of said one cylindrical member;

said rotating film traversing along the inner surface of said one cylindrical member of said one chamber from said liquid inlet a substantial portion of the length of said one cylindrical member to a position adjacent said outer cylindrical member second end;

introducing a gaseous phase tangentially to said inner surface of a short cylindrical member having first and second ends, an axis extending therebetween, a cylindrical inner surface and a diameter smaller than said outer cylindrical member diameter, said short cylindrical member being positioned concentrically within and coaxial with said outer cylindrical member, said short cylindrical member first end being open and positioned within said outer cylindrical member a predetermined distance from a lower outlet positioned adjacent said outer cylindrical member second end, such that a substantial portion of said gaseous phase helically flows from said short cylindrical member into said one chamber to a position substantially adjacent to said first end of said one cylindrical member, said substantial portion of said gaseous phase cylindrically rotating in the same direction as and in countercurrent to said rotating film and engaging at least a substantial portion of said rotating film to form a product;

exhausting at least a substantial portion of said gaseous phase and at least substantial portion of said product through an upper outlet positioned intermediate said liquid inlet and said first end of said one cylindrical member; and exhausting a substantial portion of said liquid phase through said lower outlet.

27. A method according to claim 26 further comprising repeatedly and intermittently introducing said liquid phase at a preselected rate for a predetermined time period.

28. A method according to claim 26 further comprising adding fluids having a predetermined temperature into an annular chamber adjacent to said one annular chamber.

* * * * *